No. 817,609. PATENTED APR. 10, 1906.
T. E. ADAMS.
CHUCK FOR ROCK DRILLS.
APPLICATION FILED JUNE 29, 1903.
2 SHEETS—SHEET 2.
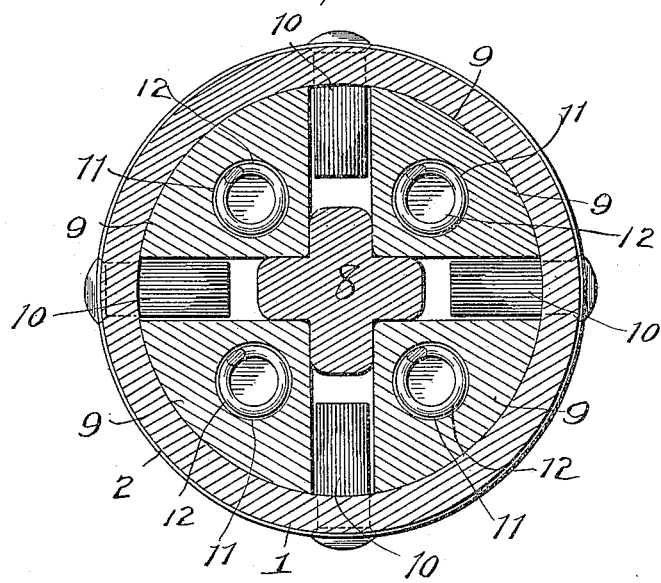
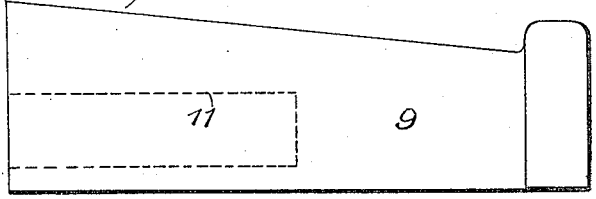
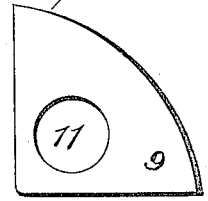
WITNESSES
INVENTOR

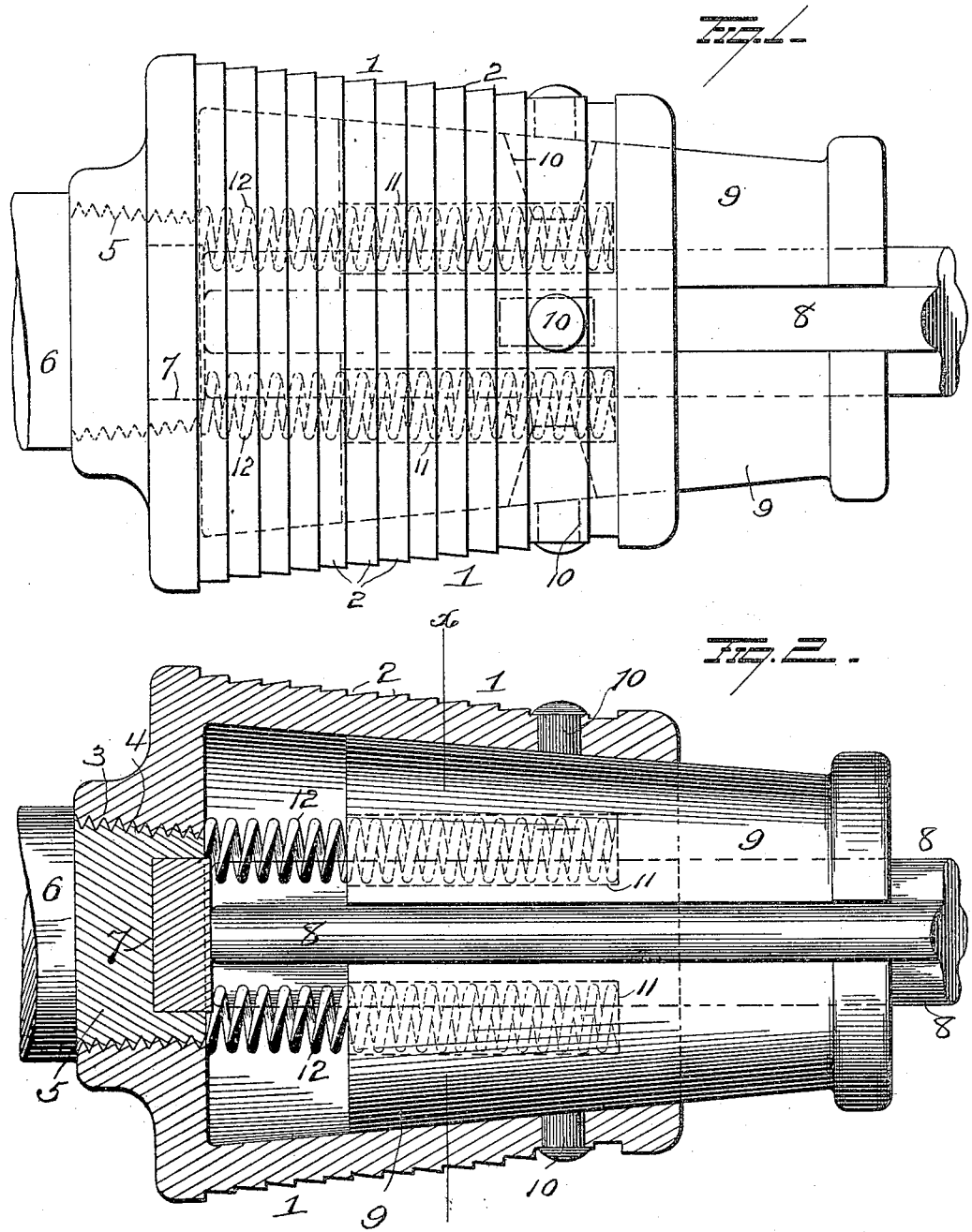

UNITED STATES PATENT OFFICE.

THOMAS EDGAR ADAMS, OF CLEVELAND, OHIO, ASSIGNOR TO THE ADAMS DRILL COMPANY, OF CLEVELAND, OHIO, A CORPORATION OF OHIO.

CHUCK FOR ROCK-DRILLS.

No. 817,609.          Specification of Letters Patent.          Patented April 10, 1906.

Application filed June 29, 1903. Serial No. 163,601.

*To all whom it may concern:*

Be it known that I, THOMAS EDGAR ADAMS, of Cleveland, in the county of Cuyahoga and State of Ohio, have invented certain new and useful Improvements in Chucks for Rock-Drills; and I do hereby declare the following to be a full, clear, and exact description of the invention, such as will enable others skilled in the art to which it appertains to make and use the same.

My invention relates to improvements in drill-chucks, and more particularly to such as are intended for use with rock-drills, an object of the invention being to so construct a chuck that it will hold the drill steel or tool without the use of a threaded bolt and so that it will receive a drill steel or tool having no shank formed thereon, thus resulting in saving labor and insuring true rotation of the steel or tool.

A further object is to construct a chuck in such manner that it will act to expel chippings, and thus prevent the same from finding their way into the bearings of the drill-rod.

With these objects in view the invention consists in certain novel features of construction and combinations and arrangements of parts set forth, and pointed out in the claims.

In the accompanying drawings, Figure 1 is an elevation of a drill-chuck embodying my improvements. Fig. 2 is a longitudinal sectional view, partly in elevation. Fig. 3 is a section on the line $x$ $x$ of Fig. 2. Figs. 4 and 5 are detail views of one of the jaws.

1 represents the body of the chuck and is made tapering toward its outer end both internally and externally. The chuck-body is made on its exterior with a series of circular or peripheral ribs 2, each having one wall at right angles to the axis of the drill and the other wall parallel with said axis. The purpose of these ribs is to throw off chips during the operation of the drill, and thus prevent them from entering the bearings of the drill-rod. The rear end of the chuck-body is made with a conical hole 3, having a threaded wall 4 for the reception of a conical threaded shank 5 on the drill-rod 6. A block 7, of hardened steel, is set into the end of the shank 5 and serves as an abutment for the rear end of the drill steel or tool 8. The steel or tool 8 is held in the body 1 by means of a series of jaws 9, each adapted at its inner edge to engage the tool, which latter is made angular in cross-section, and the jaws are so shaped as to grasp the tool in a manner to prevent it from turning. Each jaw 9 is made with a tapering exterior, so that all the jaws coöperate to form a truncated cone. The several jaws are separated and guided by a series of spacing blocks or pins 10, secured to the body 1 and extending a limited distance toward the axis thereof. A socket 11 is made in each jaw for the reception of a spring 12, the rear end of which bears against the inner face of the head of the body. Each jaw is thus forced forwardly by its spring 12, and the several springs serve to advance the series of jaws and cause them, through their coöperation with the conical interior of the body 1, to tightly grasp the drill steel or tool, rotation of the jaws and the drill steel or tool in the chuck-body being prevented by the blocks 10.

The chuck might be made integral with the drill-rod or pressed on and pinned or shrunk onto the drill-rod.

Various other slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. A drill-chuck having a tapering exterior made with a continuous series of step-like ribs.

2. A drill-chuck comprising a body having a tapering interior, a series of tapering jaws in said drill-body, each jaw having a socket in its rear end, a separate spring for each jaw, said springs entering the sockets in the jaws, and a series of pins rigidly secured to the chuck-body, said pins projecting inwardly from the inner wall of the chuck-body and entering between adjacent jaws.

3. A drill-chuck having an exterior tapering from end to end, said exterior provided with a continuous series of step-like ribs, each having a wall at right angles to the axis of the chuck.

In testimony whereof I have signed this specification in the presence of two subscribing witnesses.

THOMAS EDGAR ADAMS.

Witnesses:
H. S. JENKINS,
JOHN R. ORPUTT.